United States Patent [19]
Schindl

[11] Patent Number: 4,589,742
[45] Date of Patent: May 20, 1986

[54] MICROSCOPE FOR OBSERVING ENVIRONMENTALLY SENSITIVE OBJECTS

[75] Inventor: Klaus Schindl, Vienna, Austria

[73] Assignee: C. Reichert Optische Werke, AG, Vienna, Austria

[21] Appl. No.: 643,911

[22] Filed: Aug. 24, 1984

[30] Foreign Application Priority Data

Aug. 30, 1983 [DE]   Fed. Rep. of Germany ....... 3331193

[51] Int. Cl.⁴ .................. G02B 23/16; G02B 21/00
[52] U.S. Cl. ...................................... 350/589; 350/507
[58] Field of Search ................ 350/589, 582, 585, 507

[56] References Cited

U.S. PATENT DOCUMENTS 3,393,032  7/1968  Crisler et al. ................. 350/589
4,405,202  9/1983  Kimball ......................... 350/589

FOREIGN PATENT DOCUMENTS 1197111  11/1959  France ........................... 350/507

Primary Examiner—Jon W. Henry
Attorney, Agent, or Firm—Alan H. Spencer; Stephen Raines

[57] ABSTRACT

A microscope has a support structure which comprises a base, an upright portion, a cross-head and an objective-turret assembly mounted on an underside of the cross-head. The cross-head is mounted on the upright portion and contains principal components for forming an image. The upright portion and the cross-head define a generally planar division therebetween, whereby a generally planar gas-tight seal can be provided between the upright portion and cross-head. This enables the upright portion and the base to be disposed in a gas-tight chamber while the cross-head is located outside the chamber.

4 Claims, 2 Drawing Figures

MICROSCOPE FOR OBSERVING ENVIRONMENTALLY SENSITIVE OBJECTS

BACKGROUND OF THE INVENTION

This invention relates to microscopes and more particularly concerns a microscope for examining a specimen isolated in a gas-tight chamber.

It is known to install microscopes in gas-tight chambers for the examination of specimens which must not come into contact with ambient atmosphere. Such arrangements are employed, inter alia in investigations involving alpha-emitters, toxic materials, materials which are hazardous to health, substances kept under specific atmospheric conditions and investigations of the effects of various atmospheric influences on living organisms. A further field of application arises in the testing of wafers in the electronics industry where the wafers must not be contaminated by dust.

Microscopes which are suitable for installation, upright or inverted, in a gas-tight chamber are arranged so that the viewing and/or recording elements are separated from gas-tight chamber by a small glass plate in a mounting; such elements include viewing eyepieces, mounting units for mounting a photographic or television camera, and light sources. Other manual operations, for example, moving the specimen in an x—y plane and focussing, are carried out through two gloveports through which extend gas-tight gloves. Additional ports may be provided to enable air-locks or other chambers to be connected to the chamber, for example, to introduce a prepared specimen without exposing it to ambient atmosphere.

Such arrangements cause problems because the body of the microscope, which contains the image-forming components, is connected in a complicated manner to a support. The support is mounted on a base and may contain a drive assembly for moving the specimen in an x—y plane, and for focussing.

Sealing by the installation of a plate on the body of the microscope is an expensive operation. It is necessary to seal off the viewing eyepieces and any camera mounting unit from the gas-tight chamber. The known sealing plates for effecting such sealing are bent into particular shapes in an operation which requires a high degree of precision and hence are expensive.

OBJECT OF THE INVENTION

An object of the present invention is to provide a microscope which is particularly adapted for installation in a gas-tight chamber.

BRIEF DESCRIPTION OF THE INVENTION

According to the present invention, we provide a microscope having a support structure which comprises a base, an upright portion, a cross-head, and an objective-turret assembly mounted on an underside of the cross-head, wherein the cross-head contains image forming components of the microscope and is mounted on the upright portion, the cross-head and the upright portion defining a generally planar division therebetween, whereby a generally planar gas-tight seal can be provided between the upright portion and the cross-head so that the upright portion and the base can be disposed in a gas-tight chamber.

The invention utilizes the division between the upright portion and the cross-head to provide planar sealing surfaces which are consequently easy and comparatively cheap to seal.

The invention also enables all the image-forming components, in particular the viewing eyepieces, any mounting unit for photographic and television cameras, and also any heat-generating light sources, to be located outside the gas-tight chamber.

In one preferred embodiment of the invention, a sealing plate can be fitted between the cross-head and the upright portion to provide the gas-tight seal. Windows may be provided in the plate for the passage of image forming rays and the illuminating beam. A plate of this type, which has planar faces, is comparatively easy to manufacture, tolerance problems being avoided. The plate is suitably formed of metal.

Preferably, a peripheral portion of the plate projects outwardly beyond the upright portion and the objective-turret assembly for joining to the walls of a gas-tight chamber.

The microscope can be assembled with a gas-tight chamber in a simple manner so as to stand upright and so as to ensure a gas-tight fit around the microscope. Dimensional tolerances of the plate are not as critical as in prior arrangements. The invention results in a clearly defined dividing surface between the gas-tight chamber and the microscope.

In an alternative embodiment of the invention, the bottom face of the cross-head provides a planar surface which can be used to provide a seal so that a separate plate can be dispensed with. Again, problems relating to dimensional tolerances are avoided.

Preferably, a peripheral margin of the cross-head projects beyond the upright portion and the objective-turret assembly and carries the planar surface so that the projecting margin can be joined to walls of a gas-tight chamber. By this means, it is possible to produce a simple, flat seal between the cross-head containing the image forming components, and the upright portion containing the drive assembly.

BRIEF DESCRIPTION OF THE DRAWINGS

Further advantages, details and features are evident from the following description of two illustrative embodiments of the invention referring to the accompanying drawings, in which.

DETAILED DESCRIPTION OF THE DRAWINGS

Figure 1:
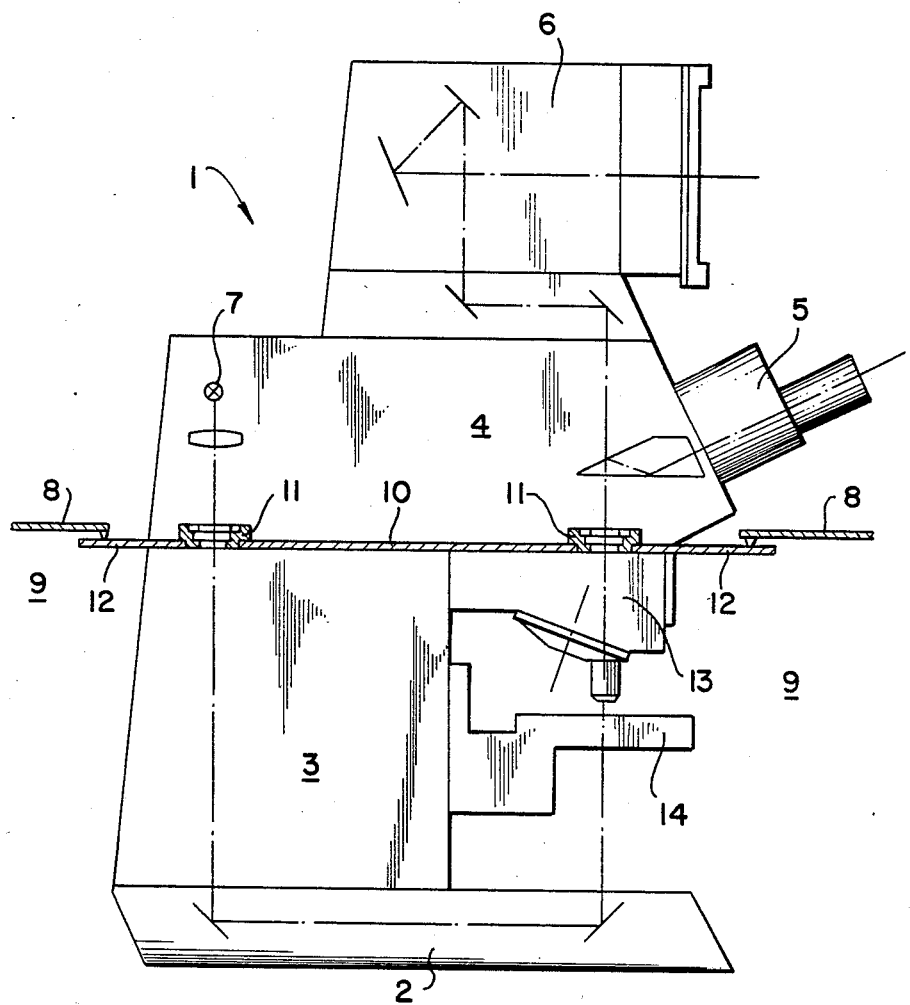
FIG. 1 shows a microscope which is a first embodiment of the invention.

FIG. 1 shows a microscope 1 of a kind which is known as a compact upright type. A support structure of the microscope comprises a base 2, an upright portion 3, and a cross-head 4, the cross-head being mounted on the upright portion. The upright portion contains a drive assembly, and the cross-head contains a light source 7, and image forming components of the microscope such as a binocular unit 5 and a mounting unit 6 for interchangeably mounting a photo camera or a television camera. A transmitted-light illuminating system is diagrammatically represented in the drawing, but incident-light or mixed light illumination systems may alternatively be provided. The light source 7 is located outside a gas-tight chamber 9, thus enabling waste heat which is produced by the light source 7 to be conducted away without affecting specimens which may be temperature-sensitive.

A flat, gas-tight sealing plate 10 extends between the upright portion 3 and the cross-head 4. The plate 10 is suitably made of metal. Windows 11 mounted in a gas-tight fit in frames in the plate enable passage of light from the light source 7 to a specimen in the chamber and passage of light from the objective-turret assembly 13 to the image forming components in the cross-head 4. In addition to the two windows shown in FIG. 1, further windows may be mounted in the plate, for example, for an illuminating system employing a second lamp installed on a rear wall of the support structure.

A peripheral flange 12 of the flat plate 10 projects laterally beyond the upright portion 3, and beyond the objective-turret assembly 13 mounted on the cross-head 4. The flange 12 projects outwardly on all sides of the microscope and is sealingly joined to walls 8 defining the chamber 9. Only marginal portions of the walls 8 are shown in the drawing.

The image-forming components of the microscope are located outside the chamber 9, and can be adjusted or replaced in a simple manner. A specimen support 14 can be manually adjusted by means of gas-tight rubber gloves installed in a wall defining the chamber or an air-lock system can be provided in known manner.

The flat sealing plate 10 engages the cross-head 4 on one face, and the upright portion 3 on the other face. Since the plate is flat, fitting the plate between the cross-head and the upright portion does not present any problems related to dimensional tolerances.

Figure 2:
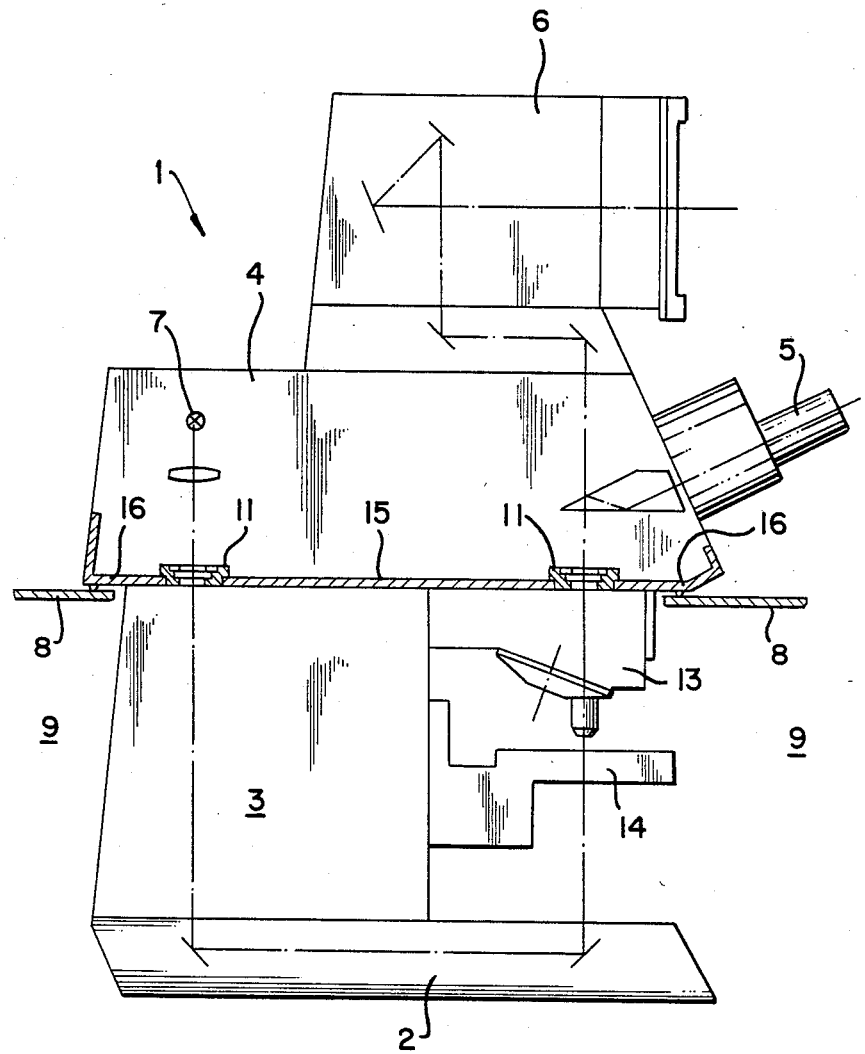
FIG. 2 shows a microscope which is a second embodiment of the invention.

FIG. 2 shows a microscope which is generally the same as the microscope shown in FIG. 1, like components being labelled with the same reference numerals.

The upright portion 3 is separate from the cross-head 4 and the cross-head includes a planar bottom face on a bottom plate 15. Windows 11 are sealingly mounted in frames in the plate 15.

A peripheral margin 16 of the plate 15 projects beyond side walls of the upright portion 3, and of the objective-turret assembly 13 which is mounted on the cross-head 4. This projecting margin 16 is sealingly joined to the marginal portions 8 of the walls defining the chamber 9.

I claim:

1. A microscope adapted to observe objects located in a non-ambient environment while the observer is located in the ambient environment, which comprises:
   a base,
   a stage mounted on said base for supporting objects to be observed,
   a support extending from said base,
   a sealing member having one side attached to said support,
   a microscope body attached to said sealing member on the side opposite said support, said body having an illumination source and imaging optics for observing an object,
   an objective mounted on said support on the same side of said sealing member as the support,
   window means in said sealing member for optically connecting the illumination source and imaging optics to said objective, and
   a planar flange extending from said sealing member for engagement with an environmental chamber seal.

2. The microscope according to claim 1 wherein said window means includes a first window connecting said source to a deflector for passing light through an object to said objective and a second window for connecting said objective to said imaging optics.

3. The microscope according to claim 1 wherein said objective is carried by a rotatable turret.

4. The microscope according to claim 2 wherein said objective is carried by a rotatable turret.

* * * * *